(No Model.)
P. T. DODGE.
LINOTYPE MACHINE.
No. 531,786. Patented Jan. 1, 1895.
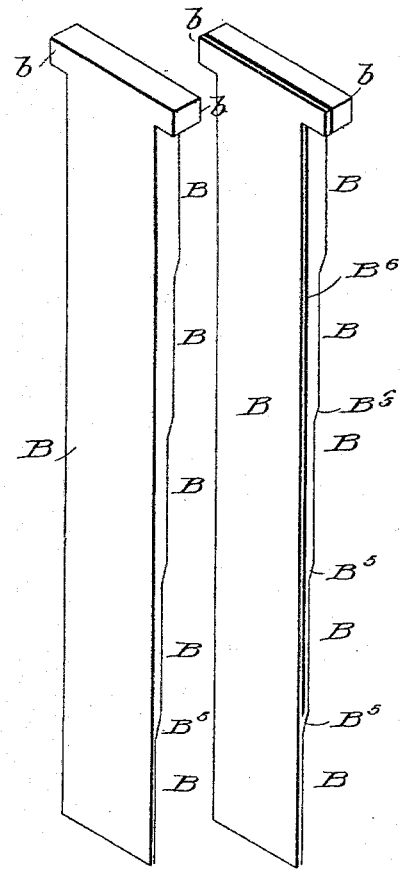
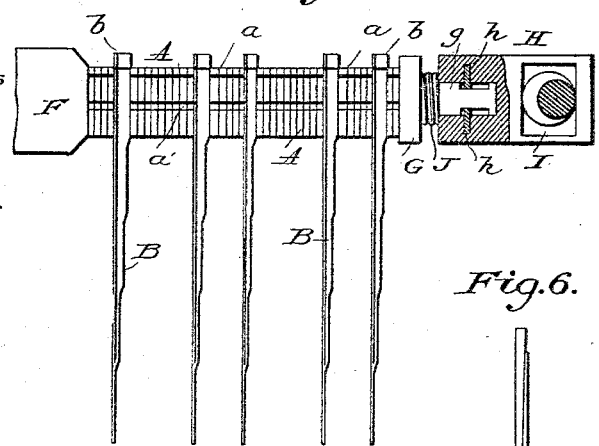
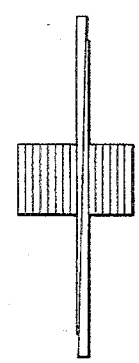
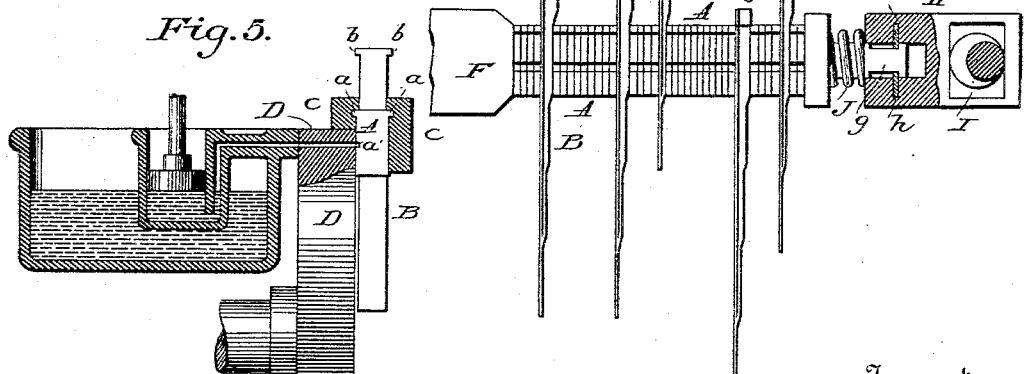
Witnesses
Raymond F. Barnes
Fabius J. Elmore
Inventor
P. T. Dodge

UNITED STATES PATENT OFFICE.

PHILIP T. DODGE, OF WASHINGTON, DISTRICT OF COLUMBIA.

LINOTYPE-MACHINE.

SPECIFICATION forming part of Letters Patent No. 531,786, dated January 1, 1895.

Application filed January 23, 1893. Serial No. 459,311. (No model.)

*To all whom it may concern:*

Be it known that I, PHILIP T. DODGE, of Washington, District of Columbia, have invented a new and useful Improvement in Linotype-Machines, of which the following is a specification.

My invention relates to the justification of assembled lines of type or type matrices; that is to say to the spacing of the composed line in order to give the same a predetermined length, and the essence of the invention consists in inserting in the line during or immediately after the close of composition, the thicker ends of elongated stepped spaces, and thereafter retracting or moving back through the line one or more of these spaces, in order that it may present in the line a diminished thickness, thus allowing the line to shorten. The bars may be operated in accordance with my invention, either individually or in series, and their adjustment effected by any suitable mechanism, one form of which will constitute the subject of a separate application.

The tapered bars may be constructed of solid metal or of suitable yielding material, or they may be compressible as described in my Letters Patent, No. 444,337, dated January 6, 1891. When compressible, they will be withdrawn until the line is approximately justified, or slightly longer than required, after which compression will be applied endwise of the line, to complete the justification.

By making use of the elongated spaces, which do not require to be removed after insertion in the line, and by introducing the thicker ends of these spaces into the line in the first instance, I am enabled to effect a speedy and exact justification without subjecting the parts to undue strain and without endangering the alignment of the matrices or subjecting them to the excessive wear, which results from the thrusting of stepped spaces between them to elongate the line.

Figures 1 and 2 are perspective views illustrating stepped space-bars, such as may be used in carrying my invention into effect. Fig. 3, is a side elevation showing a line of matrices with space-bars inserted therein, and mechanism for compressing the line, the line being unjustified. Fig. 4, is a similar view, showing the space-bars partially withdrawn and the line compressed to complete the justification. Fig. 5, is a cross-section showing the manner in which the matrices and space-bars are sustained in the guide or aligning device. Fig. 6, is a view illustrating another form of spacing device which may be used in carrying out my invention.

In the drawings, A A represent the matrices or type, which may be of any suitable form and assembled and sustained by any suitable means. In the form shown, they consist each of a flat plate of brass or equivalent material, provided with sustaining shoulders $a$ at the upper end, and with the intaglio character or matrix proper $a'$ in one edge. In form and mode of operation, they are the same as used in the well-known linotype machine, and are not claimed as part of the present invention.

B B represent tapered space-bars, each consisting of a bar or blade, of a width corresponding to that of the matrices so that it may be introduced between them as a component part of the line. Each space is provided at the upper end with sustaining shoulders and made of a length greater than the matrices and of a thickness decreasing step by step from the upper to the lower end. Thus constructed, it presents at different points in its length the several sections $B'$, $B^2$, $B^3$, $B^4$, $B^\times$, each having parallel faces on opposite sides and each joined to the next by the inclined surface $B^5$.

A space may be constructed in one solid piece, as in Fig. 1, or of suitable compressible material, or provided as shown in Fig. 2, with an internal layer of compressible material $B^6$, such as plumbago and asbestos. This compressible space is not in itself claimed herein.

In carrying out my invention, the line of matrices or type is composed or assembled by any suitable means, and the spaces introduced therein at suitable points, with their upper and thicker ends in the line. The composition is continued until the line exceeds the final length required, unless the termination of a word or syllable brings it to the exact length, which rarely happens. The overset line, that is to say the line having excessive length, is then adjusted by lifting the entire series of spaces, or one or more of the spaces independently, until the presentation of their thinner sections in the line permits the latter to be compressed or justified to the length demanded.

The adjustment of the spaces will depend upon the amount of space to be removed, the number of spaces in the line, and their varying conditions. I have found that by proper movements of the respective bars, it is possible to effect an exact justification of every line occurring in practice.

While it is preferred to employ stepped space-bars, bars which are gradually tapered from one end to the other, or bars consisting of two wedges in reverse relations to each other as shown in Fig. 6, may be employed by first inserting their thicker ends in the line and thereafter withdrawing them to the required extent.

In the drawings I have shown the line of matrices sustained in grooved rail C, by which they are maintained in front of the mold-wheel D, which is supplied with molten metal. This metal forms a bar or linotype having in one edge the characters represented by the matrices, as in the ordinary linotype machine. The line of matrices and space-bars is compressed endwise between a jaw F at one end, preferably fixed, and a movable jaw G at the opposite end. The jaw G has a neck $g$, extending into a reciprocating block H, operated by an eccentric I. An intervening spring J tends to constantly urge the jaw forward to compress the line, while keys $h$, engaging shoulders on the neck, serve to limit the movement of the jaw toward its component, or in other words, to limit the reduction in the length of the line. These keys also serve to draw the jaw backward with the slide H, as the latter retreats, in order to release the line of matrices and space-bars after the casting. The spring-actuated jaw automatically reduces the length of the line as the space-bars are retracted, to present their narrower ends in operative position.

The word "tapered" is used in this specification in a generic sense, as including all spaces which are reduced in width from one end toward the other, whether gradually or step by step.

Having thus described my invention, what I claim is—

1. In a linotype machine, elongated tapered spaces, provided with sustaining shoulders at their thicker ends, whereby they may be sustained with their thicker ends in the line during its composition.

2. In a linotype machine and in combination with a composed line of matrices, and means for sustaining the same, a series of elongated spaces diminishing in thickness from their upper to their lower ends and adapted to be lifted endwise through the line, and means for applying a compression to the line as the spaces are withdrawn.

3. In a linotype machine and in combination with a composed line of matrices, a series of tapered spaces adapted and arranged to be inserted with their thicker ends in the line in the first instance; jaws or abutments to determine the length of the line; means for automatically advancing one of said jaws toward the other to compress the line as the spaces are withdrawn, and means to limit the approximation of the jaws, to prevent excessive reduction in the length of the line.

4. The method of justifying a composed line of matrices, consisting in introducing therein the thicker ends of elongated tapered spaces applying compression endwise to the line and at the same time adjusting the spaces endwise through the line without removing them therefrom, until the line is reduced to the requisite length.

In testimony whereof I hereunto set my hand, this 6th day of January, 1893, in the presence of two attesting witnesses.

PHILIP T. DODGE.

Witnesses:
  THOS. KILVERT,
  M. S. CHASE.